Oct. 5, 1954     S. LINDEN     2,690,790
BABY'S SEAT
Filed Nov. 25, 1950
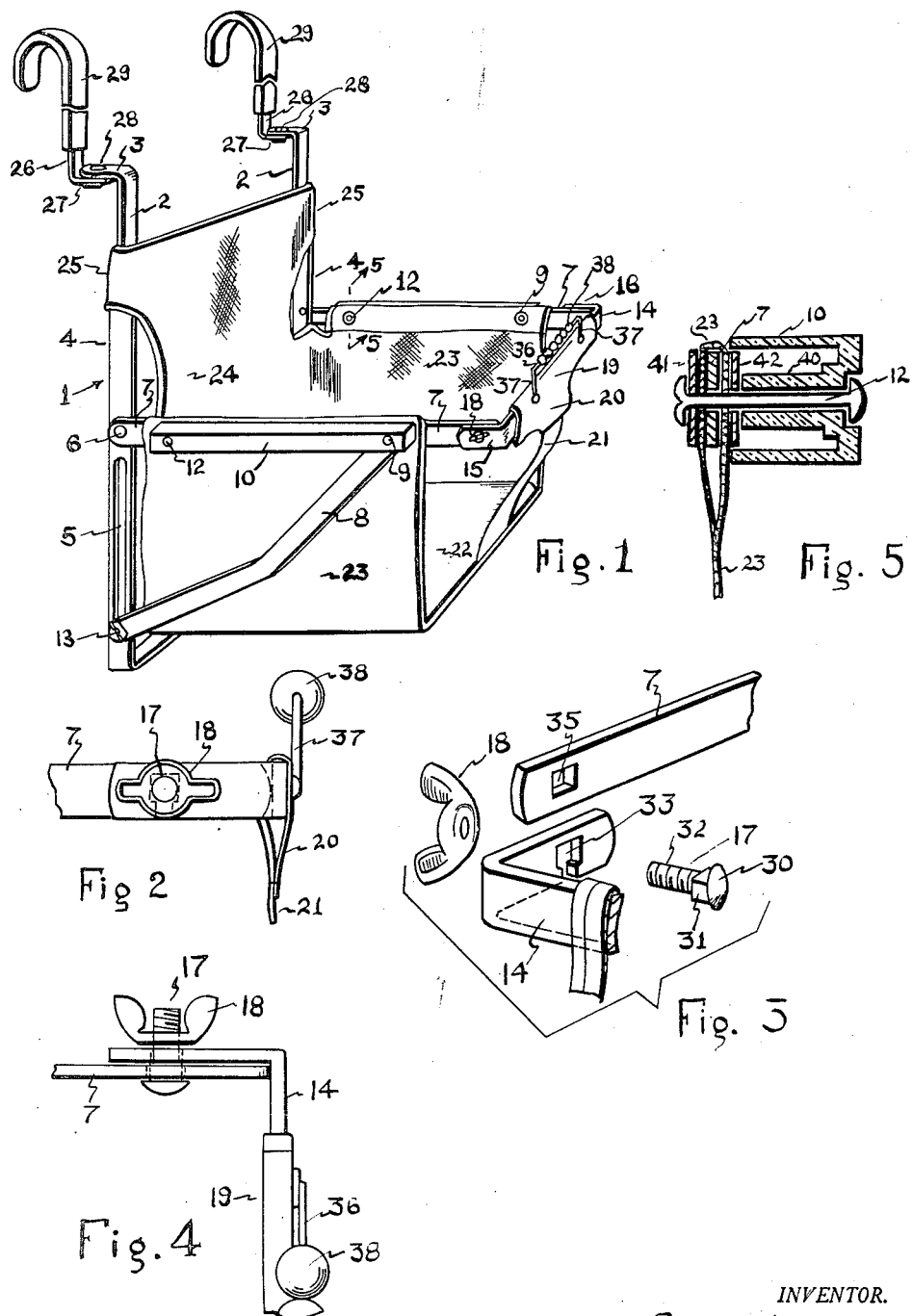
INVENTOR.
Samuel Linden
BY
Ezekiel Wolf
his Attorney.

Patented Oct. 5, 1954

2,690,790

UNITED STATES PATENT OFFICE 2,690,790

BABY'S SEAT

Samuel Linden, Chelsea, Mass., assignor to Bunny Bear, Inc., Everett, Mass., a corporation of Massachusetts Application November 25, 1950, Serial No. 197,616

4 Claims. (Cl. 155—79)

The present invention relates to a baby seat adapted to be supported by or hung over the back of an automobile seat for supporting an infant conveniently and safely. The seat of the present invention may be collapsed and folded when not in use.

A further feature of the present invention is that the front of the seat which provides openings for the child's thighs and legs, may readily be dropped down so that the child can be lifted out in a forward direction without lifting the child upwards.

Additional features of construction include the construction by means of which the cloth or fabric is supported on the frame work providing finished side supports which provide a broad surface on which the child can rest its arms or against which it can come in contact with considerable force without in any way injuring itself.

Other and further features of the present invention will be more fully appreciated from the description in the specification set forth below when taken in connection with the drawings illustrating an embodiment thereof, in which:

Figure 1 shows a perspective view of the seat as viewed from one side thereof.

Figure 2 shows an enlarged detail of the detachable front cross bar as viewed in substantially the same position as in Figure 1.

Figure 3 shows an exploded view of the same detail shown in Figure 2,

Figure 4 shows a plan view of the detail shown in Figure 2; and

Figure 5 shows a section on 5—5 of Figure 1.

In the figures the infant's seat is built up of a frame which comprises a substantially rectangular U-shaped element forming the back part of the seat. This U-shaped frame has upwardly extending prong ends 2, 2, in the same plane, the terminal sections 3 of which turn outwardly of the seat in the same plane with each other but perpendicular to the plane in which the sections 2 are found. The lower sections 4, 4 of the prongs of the frame are parallel and face each other so that between the sections 2 and 4 of the prongs there is a right angled bend. The lower end portions of the prong sections 4 are provided with slots 5 which extend just below the pivot 6 of the side arms or brackets 7 almost to the bend of the cross member of the U frame. The arms or brackets 7 are supported at their forward end by diagonal supports 8 pivoted by means of pins 9 which extend through each of the arm rest elements 10 at the forward end. The back end of the arm rest element is held tight by a suitable rivet member 12 whereas the riveting element 9 is sufficiently long to provide clearance to allow the diagonal supporting bar or bracket 8 to be turned. The lower end of the bar or bracket 8 is supported by the lower section of the prong 4 by means of a bolt and wing nut 13 which may be tightened to clamp the lower end of the bracket tightly in its place along the slot so that the side supporting arm or bracket 7 and the arm rest 10 are in a horizontal position when the seat is opened up. The forward end of the side arms or brackets 7 are bridged by means of the front bar 14 which terminates in inwardly directed angle sections 15 and 16 held in the forward end of the brackets 7 by means of a bolt 17 and a wing nut 18. (See Figure 3). The bridging section of the front bar 14 supports a sleeve 19 through which the front bar 14 extends. This sleeve has a downwardly projecting central flap 20 to which one end of an elastic element 21 is attached, the other end of which is attached at the center of the forward edge of the seat section 22. The seat section 22 may be formed with a semi-stiff base and is supported by side and back fabric elements 23, 23, for the side elements and 24 for the back elements. The side fabric pieces are looped over the supporting bracket 7 and are in part held by the rivets 9 and 12 which pass through the side arms or brackets 7 and the supporting arm rests 10. The arm rests 10 are preferably made of plastic shells formed like an uncovered box through which the rivet members 9 and 12 extend. The rivets 9 and 12 may be surrounded with spacing collars against which the inner end walls of the arm supports may bear. The back fabric section 24 of the seat extends upward and is attached only to the side prongs by looping flaps 25 about the side prongs just at their 90° twist section. The supporting brackets which support the seat as a whole, comprise two flat curved bars 26 which have lower outturned sections 27 overlapping the terminating angle ends 3 and secured thereto by freely pivoting rivets 28, 28. Rubber sheaths 29, 29, protect the curved ends of the bracket support so that their contact with the upholstery of the seat will not injure the upholstery. These supporting brackets may be turned inwardly in substantially the same plane thereby making the seat compact in packing. The seat is folded by pivoting the side brackets 7 upwards after loosening the wing nuts 13. The front bar 14 with its inwardly turned ends 15 and 16 is constructed in such a fashion that these ends readily lock in position when closed with the forward ends of the brackets, 7, so that the cross bar cannot easily be removed even though the wing nut 18 is not very securely tightened. For this purpose, the nut 17 is provided with an enlarged head 30 and a square neck or shoulder 31 beneath it between the head 30 of the bolt of the threaded section 32. The front bridging member 15 is provided with a square slot 33 matching in size the square shoulder 31 of the bolt. This square slot terminates in a smaller section 34 symmetrically positioned with the square section 33 and of such a width that the threaded portion 32 of the bolt may be slipped through it. The side brackets 7 are also formed with a square hole 35 in which the shoulder 31 of the bolt 17 will fit. The shoulder 31 is sufficiently long to extend through the slot 33 and also into the hole 35 so that when the wing nut 18 is tightened on the threading section 32 of the bolt 17, it is impossible for the front bridging bar 14 to be dropped down. However, loosening the wing nut will permit the bolt 17 to be pushed backwards so that the bridging bar 7 may be dropped down in which case the bar will be supported by the elastic strip 21, but will hang below the seat. In this position the child can easily be taken out forwards. When however the bridging bar is secured into place even in a careless fashion, the bridging bar cannot be loosened and there need be no fear of the child falling out of the seat.

A wire 36 has its ends 37 downwardly extending and riveted to the front bar 14. This wire may hold various amusement elements, as for instance large beads 38 of various colors.

The portable seat of the present invention is so freely supported on the back rest of the automobile seat that the infant has great freedom of motion and yet there is no danger of his falling out.

In the section shown in Figure 5, it will be noted that the arm rest 10 is hollow with two tubular posts 40 projecting inward through which the rivets 9 and 12 extend into and through the side brackets 7. The fabric side 23 loops around the side bracket and washers 41 and 42 lie against the fabric on the opposite side of the bracket. The end of the rivet 12 is riveted over the washer 41.

At the forward end the arm rest is held in the same way as in the rear except that here the diagonal support or bar 8 is positioned between the inner washer 42 and the inner shoulder of the post 40.

Having now described my invention, I claim:

1. A portable seat for a baby adapted to be hung over the back rest of an automobile seat comprising a rectangular U-shaped frame forming the back of the seat and terminating in hooked ends adapted to be hung over the back rest of an automobile seat, a pair of side brackets, each having ends pivoted to the sides of the U-shaped frame at a level to serve as arm rest supports, diagonal supporting bar members, having one set of ends pivoted to the non-pivoted ends of said side brackets and their other set of ends adjustably supported in slots in the lower part of said sides of the U frame, a front bar member extending across the seat, means for removably attaching said front bar to said side brackets, including a locking bolt having an enlarged shoulder adjacent its head together with enlarged holes in one of said non-pivoted bracket ends and front bar into which the enlarged shoulder of said bolt fits with one of said holes having a slot sufficiently wide to pass the shank of said bolt extending into one of said enlarged holes whereby said enlarged head must be withdrawn from the holes to drop said bar without removing said bolt, a fabric attached to the frame and side brackets covering the back, sides and bottom of the seat and a strap member extending from the front of the bottom of the seat proper to said front bar.

2. A portable seat for a baby as set forth in claim 1, in which the shoulder of said bolt is square and the holes in said side brackets and front are also square to fit the square shoulders of said bolt.

3. A portable seat for a baby adapted to be hung over the back rest of an automobile seat, comprising a substantially rectangular U-shaped frame with the sides of the U extending in parallel planes from the bottom cross member of the U upwards for a substantial portion of the distance to the top of the U, said sides having a 90° twist in their top section whereby the upper end sections of said sides are in the same plane, both said end sections of said sides of the U having similarly outwardly turned portions at their upper ends, hooked members having shanks with angle bends positioned to lie in face to face relation with said outwardly turned portions and pivotally connected to said portions, a pair of side brackets each pivotally supported at one of its ends to the sides of the U in the section where said sides are parallel to each other, said bracket forming the side supports for said seat, adjustable diagonal supporting bar members, each having an end pivoted to the non-pivoted ends of said side brackets and each having its other end slidably adjustable one each in slots in the lower portions of the sides of said U, a removable front bar extending across the seat with inwardly extending angle ends, means for removably clamping said front bar at its ends near to the ends of the side brackets and a fabric attached to the frame and side brackets forming a covering for the back, sides and bottom of the seat, in which the fabric covering the back of the frame is attached by forming a loop with the fabric about the sides of the frame covering the section having the 90° twist therein and in which the covering for the sides are looped about the side brackets.

4. A portable seat for a baby as in claim 3 with plastic arm rests attached to the side brackets, said arm being formed substantially as elongated boxes open along the inward face, the outer side having hollow tubular posts secured thereto extending within the box and rivets extending through said tubular posts, the shell of the box and said side brackets riveting said arm rest assembly together.

References Cited in the file of this patent

UNITED STATES PATENTS

| Number | Name | Date |
|---|---|---|
| 1,750,435 | Silver | Mar. 11, 1930 |
| 2,546,790 | Shook | Mar. 27, 1951 |
| 2,548,016 | Goldberg | Apr. 10, 1951 |